Nov. 6, 1956     C. J. LUCIA ET AL     2,769,303
SPLIT PATH TRANSMISSION AND SUPERCHARGER DRIVE
Filed May 14, 1953     3 Sheets-Sheet 1

INVENTORS
CARROL J. LUCIA &
JULIUS E. WITZKY.
BY Wilson and Redrow
ATTORNEYS.

INVENTORS
CARROL J. LUCIA &
JULIUS E. WITZKY.
BY Wilson and Redrow
ATTORNEYS.

Nov. 6, 1956
C. J. LUCIA ET AL
2,769,303
SPLIT PATH TRANSMISSION AND SUPERCHARGER DRIVE
Filed May 14, 1953
3 Sheets-Sheet 3
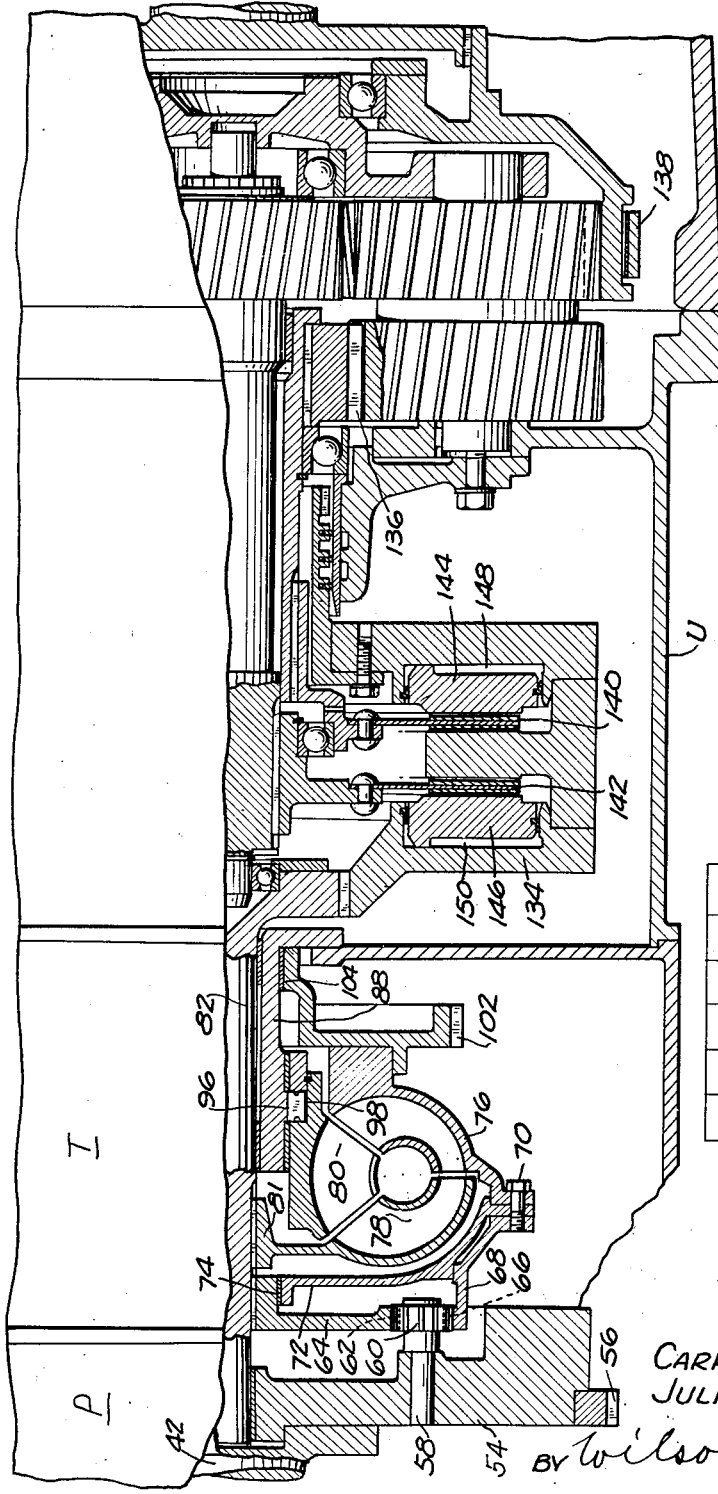
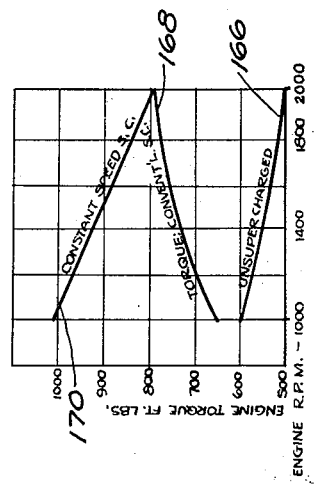
INVENTORS
CARROL J. LUCIA &
JULIUS E. WITZKY.
BY Wilson and Redrow
ATTORNEYS.

United States Patent Office 2,769,303
Patented Nov. 6, 1956

2,769,303

SPLIT PATH TRANSMISSION AND SUPER-CHARGER DRIVE

Carroll J. Lucia, Birmingham, and Julius E. Witzky, Royal Oak, Mich.; said Lucia assignor to Studebaker-Packard Corporation, Detroit, Mich., a corporation of Michigan Application May 14, 1953, Serial No. 355,086

17 Claims. (Cl. 60—13)

The present application relates to an engine-powered transmission arrangement for driving a load and for additionally controlling the speed of and driving an air supplying engine accessory which delivers air at super-atmospheric pressures. More specifically the transmission provides split power paths which are mechanically in parallel to one another and which provide different varying ratios between the engine and the load, at the same time making available under predetermined speed range conditions, a substantially constant speed source from one such path which is ideally suited through an appropriate side drive to power various engine accessories and particularly a supercharger or turbo-charger or other turbo-connected accessory.

In the field of air-consuming combustion-power plants a long-standing desire has been to provide the combustion supporting air at varying super-atmospheric pressures such that the appropriate changing pressure ratios cause the output torque of the power plant to vary in accordance with artificial values more dependent upon the character of the environment or of the load rather than upon the inherent or natural tendencies of the power plant. Independent operator controlled sources of power for driving superchargers, for instance, or at least separately operator controlled sources are frequently provided to produce the appropriate pressure ratios at various desired speeds within the range of the power plant. In aircraft supercharger work for example, where the superchargers are otherwise sometimes geared inflexibly to an aircraft engine supplied thereby and will not of themselves compensate for rarified atmosphere so as to increase the pressure ratio over the ratio maintained at the sea level, several constructions have been proposed whereby an increased engine supercharging effect is accomplished under the rarified atmospheric conditions under which it is desirable that engine speed and engine power be maintained as close as practicable to sea level values.

For instance, in the U. S. Patent 2,505,713 issued April 25, 1950, to Carroll J. Lucia one of the inventors herein there appears the disclosure of an aircraft supercharger having a normal drive from the aircraft engine supplied thereby and having a separately operator controlled waste gas turbine available for driving the supercharger through an overrunning clutch at higher than normal speeds under high altitude rarified atmospheric conditions. An example of an independent or a separately operator controlled source of power for a supercharger drive is further found in certain ground installations where, to the contrary the desire is for a substantially constant speed engine supercharger of else for an engine supercharger having its higher speeds to occur more so at low speeds of the engine rather than at the higher operating speeds of the engine. In such ground installations independent sources of operator controlled power have been used which are not influenced by the speed of the engine and which do not fluctuate at all. In each of the foregoing cases, however, the operator's action and close attention are required and a decided advantage is to be realized from having a supercharged engine employed in a manner so as to drive its own supercharger and through an automatically compensating interconnecting drive means such that the supercharger is caused to operate continuously at its constant designed speed of highest efficiency and therefore provides the same rate of flow of air to the engine at high speeds of the engine as at low speeds. The principles behind this advantage are best grasped once it is realized that when the speed of an internal combustion engine normally consuming 400 lbs. of air per hour is reduced in half actually requiring only 200 lbs. total air per hour, the 400 lbs. which is still available per hour as from a constant speed supercharger raises the effective pressure of air to the engine under the low speed engine conditions, raises the effective compression ratio, raises the magnitude of energy in each of the explosive impulses, and thus minimizes the loss of horsepower or torque which might occur at the reduced speed or in some instances even causes an increase of torque at the lower speeds.

It is an object of the present invention to provide an air impeller-transmission-engine arrangement in which the impeller derives its power from the driving engine through the transmission and in an automatically ratio compensating manner whereby the transmission drives the impeller at a substantially constant speed within a predetermined engine-transmission speed range. In one preferred form of such an arrangement a supercharger is employed to function as the air impeller, a slip drive train provided by a planetary overspeeded torque converter serves as the automatic ratio adjusting transmission, and the engine is of the supercharged diesel type. The planetary-overspeeded torque converter has a dual function in its capacity during transmission slow down due to increasing loads, first in that the increase of slip permitted by the torque converter when it is overspeeded is such as to permit an increase in the effective planetary ratio for driving the supercharger so as to raise the pressure ratio of the supplied air to the ambient air and keep the loss in output horsepower to a minimum, and second in that the low speed torque multiplication inherent in the torque converter type slip drive increases with slip and thus the torque converter transmits its self-multiplied torque at a greater effective ratio. In more concrete terms by way of illustrative figures, the torque of a constantly inflexibly geared supercharged engine can be increased by a change to the flexibly geared supercharger present arrangement by 50% for instance at the low end of the speed range and when at least a portion of the torque is transmitted through the torque converter which may have a multiplication ratio of approximately 3 to 1, the final torque realized may be as much as 230% more than the initial torque above considered.

According to a feature of the present improved technique for coupling together an engine and a load, an interposed slip drive type of split path transmission is provided which in addition to having a first connection to the load, has a further connection by means of a geared side drive to a turbocharger; through such second connection the first connection is rendered effective to prevent run away of the turbo-charger for the reason that the latter is always connected to a heavier-than-necessary load. According to a further feature such turbocharger is formed of supercharger and turbine components of which the supercharger component is connected to the transmission and the turbine component is connected to the supercharger through an overrunning clutch; at relatively low turbine speeds, the overrunning clutch permits the supercharger component to be driven sufficiently fast by the transmission to overrun the turbine, whereas at high turbine speeds the overrunning clutch engages and serves continuously to connect the turbine to two loads and prevent an unloaded run away of the turbine to occur.

Another object of the invention is to provide a split path type torque converter transmission particularly suited to military and tank applications and to earth moving machinery, power shovels, off-the-road vehicles, paving rollers, and the like prime mover powered mechanisms in which slip type drives are of benefit in functioning to allow lowered engine stall speeds and substantial torque multiplication at the stall speed. These factors are determinative of the relative lugging capacity by which machinery of this type is usually measured and high lugging capacities are greatly to be desired in such machinery.

An additional object, broadly, is to provide, for use with an engine having a normally imposed main load and also a continuously imposed accessory load, a common transmission for driving both loads and in a fashion whereby the transmission automatically compensates for variations in the engine and main load speeds to drive the accessory load at substantially a constant speed. Engine accessories hitherto driven at speeds proportional to the engine speed result in much wasted horsepower. For instance, lubricating oil circulating pumps and other engine pumps are normally partially bypassed at their higher speeds which have previously been attendant with higher engine speeds, and the air circulated by cooling fans at high engine speeds is ordinarily wasted in the cases of vehicle engine installations where forward motion of the vehicle causes a natural circulation of sufficient air for engine cooling. The engine generator and other accessories are likewise desirably driven at constant speed rather than at speeds which have the disadvantage of tending to become much higher than necessary toward the upper limits of the operating speed range of the engine. The invention herein disclosed overcomes the foregoing disadvantages.

Further features, objects and advantages will either be specifically pointed out or become apparent when for a better understanding of the invention reference is made to the following written description taken in conjunction with the accompanying drawings in which:

Figs. 4 and 5 are longitudinal sectional views to enlarged scale of portions of the structure of Fig. 1; and Fig. 6 is a graph including a set of three torque-speed curves for variously supercharged engines of the general type shown in the power plant of Fig. 1.

Figure 1:
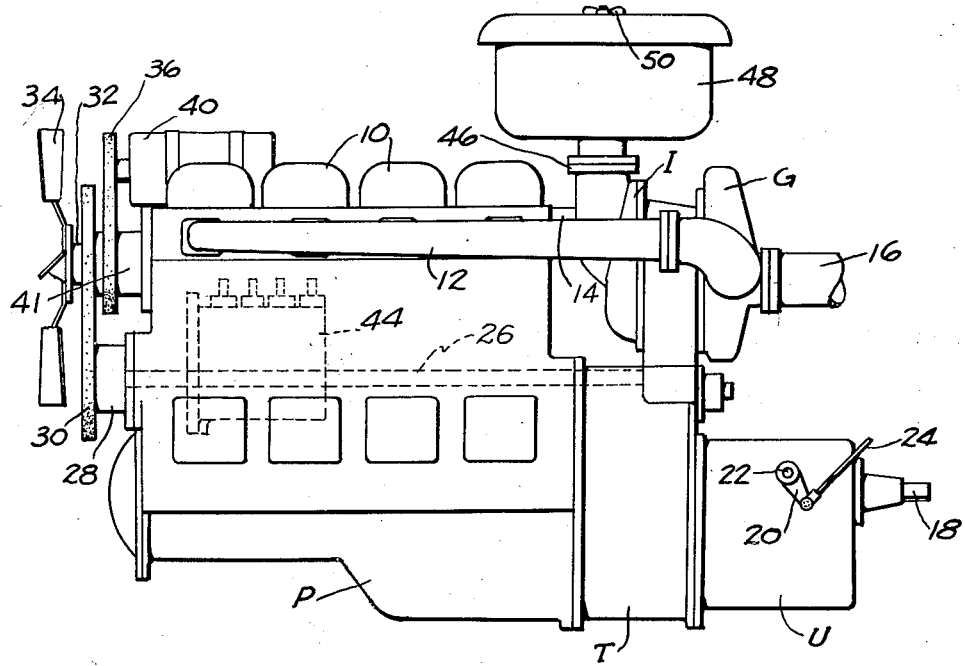
Figs. 1 and 2 are views taken from the left side and rear end of a power plant embodying the present invention.
Figure 2:
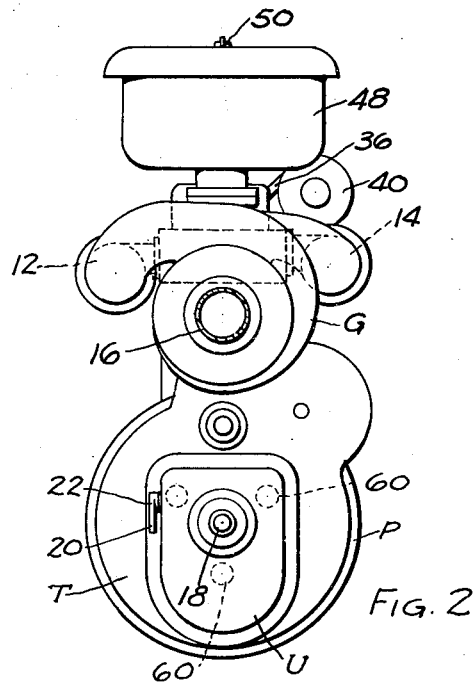
Figure 3:
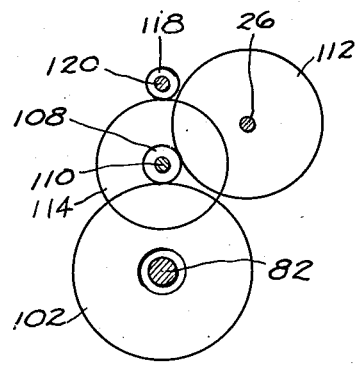
Fig. 3 is a view similar to Fig. 2 and diagrammatically showing the relationship of various step-up gear trains within the power plant.
Figure 4:
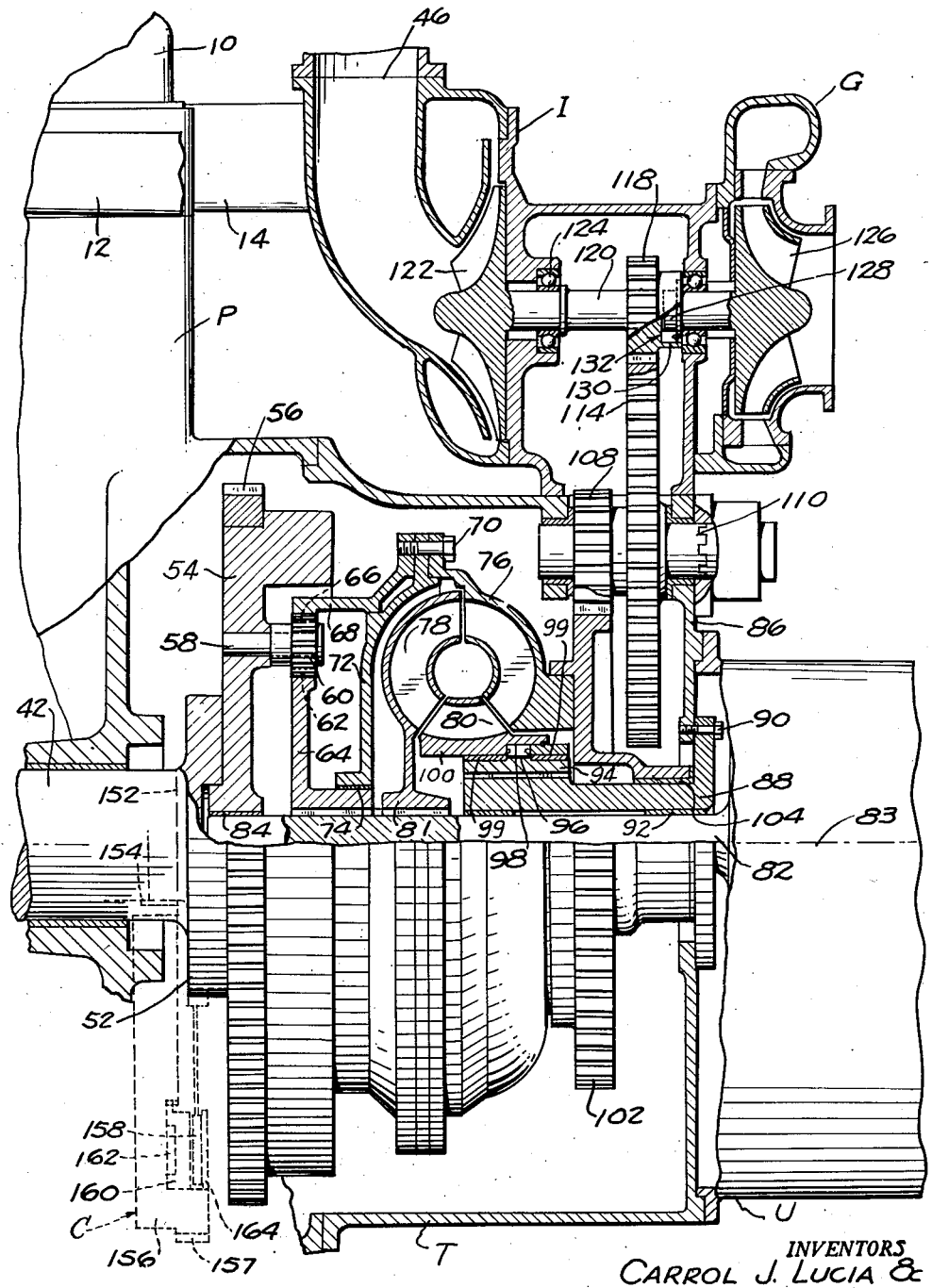

In Figs. 1 through 5 of the drawings, an engine source of prime power is shown at P which is of the supercharged diesel type. The engine includes one or more cylinders 10, four such cylinders actually appearing in Fig. 1, and these cylinders 10 are provided with a common exhaust manifold 12 for leading waste gases to the rear of the engine and an induction manifold 14 for super-atmospheric air which leads forwardly to the cylinders 10. A forced stream of air is supplied to the intake manifold 14 by an impeller component I and the hot waste gases from the exhaust manifold 12 may be utilized as motive fluid to energize a gas turbine component G having an exhaust pipe 16 and leading to an engine muffler, not shown. The provision of the gas turbine G is optional but, when so provided as in accordance with the present preferred embodiment of the invention, the turbine component G operates in conjunction with the impeller component I to form a so-called turbo-charger unit which by being compounded with the prime engine source P utilizes the otherwise wasted hot exhaust gases to provide an auxiliary source of power.

A split path slip drive transmission T having both mechanical and hydrodynamic components is provided for coupling the engine P to a load indicated by a propeller shaft 18 in conjunction with a change speed constant mesh gear unit U. The gear or transmission unit U is internally valve-operated through a control valve, not shown, which is under the control of a lever 20 pivoted at 22 to the side of the case of the gear unit U. A manually shiftable control link 24 is pivotally attached to the outer end of the control lever 20 to afford operator control over the gear unit U. In one upper corner of the transmission T a forwardly extending accessory drive shaft 26 is provided which is drivingly connected to a lubricating oil pump indicated at 28 at the forward end of the engine P. The accessory drive shaft 26 also drivingly carries a sheave at the forward extremity thereof which by means of a V belt 30 is drivingly connected to a sheave fixed to a shaft 32 for driving an engine cooling fan 34. The shaft 32 carries another sheave which by means of a V belt 36 drives a rotor-carrying shaft 38 for a generator 40. The shaft 32 additionally drives a water pump indicated at 41. In the present diesel type engine P a set of fuel injection pumps 44 is provided in number corresponding to the number of the cylinders 10 and the fuel injection pumps along with a cam shaft, not shown, are connected by a conventional chain or gearing to be driven at one-half crankshaft speed of the engine P.

The air impeller I supplying the induction manifold 14 has a flanged inlet 46 to which there is fastened a combined air filter and silencer 48. The air filter 48 carries a cover detachably connected thereto by a wing nut 50. The previously referred to crankshaft of the engine P is indicated at 42 and carries a flange 52 at the end thereof which is connected by two or more bolts to an engine flywheel 54. The flywheel 54 has a set of starter gear teeth 56 at the periphery thereof and mounts a plurality of planet-carrying pins 58 preferably three in number which are angularly spaced at 120° in a circumferential direction with respect to one another. The flywheel 54 serves as the input member to a planetary or epicyclic differential gear component having a set of planetary pinions 60 mounted one on each of the three pins 58. Each planetary pinion 60 meshes with a set of teeth 62 on the outer periphery of a sun gear 64 and further meshes with a set of internal gear teeth 66 carried at the inner periphery of an annulus or ring gear 68. When relative rotation is caused to occur in the planetary component, the three planetary pinions or planets 60 orbit about the sun and ring gears 64, 68 and in so doing function to provide a split path drive from the fly-wheel 54 to the sun gear 64 by means of a speed reduction ratio and to the reaction ring gear 68 by means of a speed increasing ratio. The sun gear 64 acts as the main output member of the planetary gear component. An overspeeded power path which is parallel to the main power path through the output sun gear 64 is provided by means of a fluid filled torque converter slip drive component having a bladed input pump or impeller 76 and a radially extending support member 72 both of which are fastened to the ring gear 68 by means of a plurality of screws as at 70. The support member 72 has a central opening receiving a bearing 74 in which a hub portion of the sun gear 64 is piloted. The torque converter component is of the well known basic Fottinger type and has three elements including the pump element 76, a bladed turbine element 78, and a bladed reaction or guide element 80. The turbine element 78 has a hub 81 which together with the sun gear 64 is splined to a central shaft 82 having an axis of rotation coaxial with the crankshaft 42 and generally indicated at 83. The flywheel 54 has a central opening receiving a bearing 84 in which the extreme forward end of the shaft 82 is piloted. The split path slip drive transmission T has a case generally indicated at 86 to which the flanged end of a sleeve 88 is bolted as by one or more fasteners 90. The flanged sleeve 88 contains a bearing 92 which rotatably receives the central shaft 82. The sleeve 88 has a set of external splines on which it carries a one-way brake portion 94. The brake portion 94 cooperates in non-return braking relationship with a companion one-way brake portion 98 through an interposed set of one-way sprag elements 96 and coaxial sleeve bearings 99 at each side thereof.

The reaction element 80 in the torque converter component is carried by a hub 100 serving as the one-way brake portion 98 and through the action of the sprag elements 96 and the stationary brake portion 94 functions in conventional fashion to aid in torque multiplication during low speed high slip drive of the three-element torque converter. That is to say, on initial acceleration through the torque converter component the impeller 76 is rotated in a counterclockwise direction due to similar rotation of the engine crankshaft 42 and the overspeeded planetary reaction member 68 when viewed from the rear of the transmission T. The shaping of the blades of the impeller 76, turbine 78, and guide element 80 of the converter component is such as to direct the converter fluid against the blades of the guide element 80 in a manner as to tend to rotate the guide element in a reverse or clockwise direction. Due to the one-way braking effect at 96 between the guide element 80 and the sleeve 88 held stationary by the transmission case 86, the guide element 80 is locked against reverse rotation and a reaction effect is produced which multiplies the torque transmitted by the converter component. This torque multiplication greatly enhances the accelerating and lugging power necessary for starting drive or for increasing the speed of the load or other power mechanism connected to the shaft 82. During the major portion of the torque multiplication period the guide element 80 is locked up in stationary position. As the load speed increases, the speeds of the impeller element 76 and the turbine element 78 will tend to attain substantially the same value. As the speeds of these elements approach the same value, the reaction forces directed against the blades of the guide element 80 gradually disappear and the impelled fluid within the converter component begins to drive the guide element forwardly in a counter-clockwise direction. When the impeller, turbine, and reaction elements 76, 78, 80 are all rotating under torque in the same direction at substantially the same speed, the converter component is functioning as a simple fluid coupling and the torque multiplying phase or period has terminated.

A gear 102 concentric with the central shaft 82 is rotatably supported on a sleeve bearing 104 which is carried by the stationary sleeve 84. The gear 102 is secured to the pump element 76 of the torque converter component and rotates with the latter. A pinion 108 meshes with the gear 102 and is made fast to a shaft 110 which is rotatably mounted at each end in bearings which are set in the case 86. The pinion 108 meshes with a gear 112 which is fast to the shaft 26 for driving the engine accessories. An intermediate gear 114 is made fast to the shaft 110 as by splines for conjoint rotation with the pinion 108 and the intermediate gear 114 meshes with a pinion 118 provided on a layshaft 120. The layshaft 120 drives an air impeller or rotor 122 in the component I which may be of the centrifugal supercharger type and which has a set of anti-friction ball bearings 124 adjacent thereto for supporting the shaft 120. A waste gas turbine G may be provided if desired and will be seen to include a radial in-flow rotor wheel 126 which is mounted to another layshaft 128 disposed in axial alignment with the layshaft 120. The pair of coaxial shafts 42, 82 and the pair of coaxial layshafts 120, 128 define a common plane in which they are transversely offset with respect to one another in parallel relationship. A one-way clutch 132 may be provided if desired between the layshafts 120 and 128 in which instance the inner shaft 128 serves as a one-way clutch portion and a part 130 carried by the pinion 118 serves as the companion one-way clutch portion. The arrangement is such that the geared drive from the intermediate gear 114 may drive the impeller 122 during low speed operation of the rotor 126 in the waste gas turbine G at which time the one-way clutch 132 permits the shaft 120 to overrun the axially aligned shaft 128. Under conditions of high speed operation of the waste gas turbine rotor 126 brought about by rapid flow of waste gases due to greater rate of effective displacement of the engine P, the clutch 132 is caused to become engaged and the driving rotor 126 is thus continuously coupled at high speeds not only to the load imposed thereon by the air impeller 122 but also to the continual main load available through the intermediate gear 114. The central shaft 82 is bolted to a rotatable clutch housing 134 which selectively drives the appropriate input portions of a change speed constant mesh type of compound planetary gear set generally indicated at 136 in the unit U.

One or more pressure actuated brake bands 138 are provided for changing the speed ratio through the compound gear set 136 and also a pair of clutch discs 140, 142 is provided each of which is engageable by a movable piston 144, 146 which is operated due to pressurization of a set of respective working chambers 148, 150. The noted planetary gearing 136 and the brake and clutch controls 138, 140, 142 are operated in conventional fashion well known in the art to produce a forwardly and reversely driving transmission having various change speed ratios as desired under conditions of constant mesh between the gears in the unit U. It is understood of course that the unit U may be conditioned for neutral setting by proper operation of the valve controlling lever 20 to cause the brake bands 138 and the clutches 140, 142 to be held in disengaged positions such that drive cannot be transmitted from the engine crankshaft 42 and the central shaft 82 to the propeller shaft 18.

In order to facilitate starting of the engine P it is contemplated that the clutches 140, 142 and the brake band 138 in the transmission unit U are released and held in disengaged positions throughout the engine cranking and warm-up operation so as to free the central shaft 82 from the load represented by the gear unit U and the loaded propeller shaft 18. In order further to facilitate the cranking operation, an intervening combined auxiliary flywheel and disengageable clutch unit C may desirably be provided between the engine crankshaft 42 and the main flywheel 54. In such instance, the flange 52 may be separately formed from the shaft 42 as along the dotted line of demarcation generally indicated at 152 and is piloted in the resulting axial recess in the shaft 42 by means of a bearing 154. A fairly heavy rotatable auxiliary fly wheel or case 156 is splined to the periphery of the crankshaft 42 and receives therein a clutch disk 158 which is splined to the flange 52. A set of starting gear teeth is carried by the case 156 at 157. A piston 160 carried in the rotatable case 156 is movable, due to the pressurization of a working chamber 162, toward an opposed radial flange 164 carried by the case 156 so as to clamp the clutch disk 158 therebetween and establish a disengageable drive from the crankshaft 42 to the flange 52 which is bolted to the main flywheel 54. For more complete information on the relationship and mechanical coaction of the rotatable case, piston, clutch disk, and flange 156—160—158—164 which are conventional, reference may be had to the transmission section VII for 1953, Service Manual, Packard Motor Car Company, Detroit 32, Michigan.

Disengagement between the piston 160 and the clutch disk 158 will permit a free cranking operation of the engine P without the burden of the load afforded by the transmission T.

As previously noted the planetary pinions 60, providing a split power path for the available torque from the crankshaft 42, conduct a portion of the torque to the shaft 82 directly through the sun gear 64 in reduction drive, and conduct the remaining portion of the torque through a parallel overspeeded power path leading from the output ring gear 68 and the overspeeded torque converter input element 76 through the output element 78 to the shaft 82 and also the loaded gear 102.

In one contemplated physical embodiment of the present invention the prime mover engine P has a governed speed of 1600 R. P. M. and a stall speed of 1000 or 1100 R. P. M., the torque converter component in the transmission T has a torque multiplication value of 3:1 at stall speed, and the planetary gearing in the transmission T has an overspeeded ratio of approximately 1.6:1 under the stall or stationary condition of the central shaft 82. The constantly meshed step up gear trains from the overspeeded torque converter element 78 to the accessory shaft 26 and to the air impeller layshaft 120 are 3.4:1 and 17:1 respectively. At the governed speed of 1600 R. P. M. of the engine, it is assumed that a slight amount of relative rotation occurs in the planetary component in the transmission T due to a reasonable amount of slip or differential speed, for example 100 R. P. M., in the torque converter component. The relationship of various representative speeds prevailing in the system are tabulated as follows:

*Speeds in R. P. M. (1.6:1 planetary ratio)*

| Carrier (54) | Sun (64) | Ring (68) | Accessory Shaft (26) | S/C (122) |
| --- | --- | --- | --- | --- |
| 1,100 | 0 (Stall) | 1,760 | 6,000 | 30,000 |
| 1,600 | 1,500 | 1,760 | 6,000 | 30,000 |

It is at once apparent that at the limits thereof and generally throughout the foregoing speed range of 1100 to 1600 R. P. M., the speed of the accessory shaft 26 will tend to remain substantially constant at 6000 R. P. M. and the speed of the supercharger shaft 120 will tend to remain constant at substantially 30,000 R. P. M. Between the lower limit of 1100 R. P. M. upward to 1600 R. P. M., the slip in the torque converter becomes progressively less and, accordingly, the speed reduction in the direct path to the sun gear 64 decreases from its stall relationship and approaches a 1:1 ratio at the theoretical point of no slip or solid drive in the torque converter. The speed increasing ratio in the overspeeded portion of the train, that is through the ring gear 68 and the overspeeded torque converter element 76, varies in an inverse relationship with respect to the ratio in the just noted direct drive path and thus decreases from the ratio of 1.6:1 corresponding to stall and approaches the 1:1 ratio corresponding to the theoretical no slip or solid drive operating condition of the torque converter component.

Conversely, when the slip in the torque converter increases due to added load, the speed ratio through the planetary component and the overspeeded ring gear 68 and the torque converter element 76 increases toward 1.6:1, thus increasing the overall speed ratio through the planetary component and the series connected step-up trains to the supercharger and other accessories; a compensating ratio effect therefore occurs tending to offset the naturally attendant slowing down of the engine due to the added load and hence the speed of these accessories tends to remain constant during application of and operation under increased load. In the contemplated physical embodiment just considered the relationship of the radial distances between the central shaft axis 83 and the respective pitch line at 62, the pinion axis at 58, and the pitch line at 66 has the ratio of 4.5:6. The division of torque occurring in this instance is accordingly such that a 60% portion of the torque will be transmitted through the 3:1 multiplication ratio of the torque converter and a 40% portion will be directed to the shaft 82 through the sun gear 64. Thus if 600 ft. lbs. of torque is available at the input side 58 of the planetary component then the equivalent of 1320 ft. lb. total output torque is available as the numerical sum of the trebled amount of the 60% portion and the single amount of 40% portion of the input torque. The full benefit of this advantage is best appreciated when the behavior characteristics of a known engine are concurrently being considered.

The torque-speed curves of a presently manufactured constant displacement multi-cylinder diesel engine are reproduced in part in Fig. 6 to show typical torque behavior of such an engine under three conditions: first, a solid line upper curve 166 shows the un-supercharged character of the engine from the torque standpoint; second, a solid line middle curve 168 shows the torque characteristics of the engine when supercharged with a self-driven inflexibly connected supercharger; and third, the solid line lower curve 170 shows the supercharged character of the same engine from the torque standpoint under conditions of constant speed supercharging.

The latter curve 170 can readily be duplicated by the proper application to the engine of a split path slip type drive incorporating the foregoing principles of substantially constant speed supercharging and the curve 170 will be seen to have its operating limits conveniently assigned in round numbers shown to be a 1000 R. P. M. stall speed and a 2000 R. P. M. governed speed for the engine as thus adapted. It will be noted that the stall torque at 1000 R.P.M. in the conventional inflexibly geared supercharger arrangement as reflected by the curve 168 is considerably smaller than the torque at 2000 R. P. M. shown on the curve 168. The torque for the constant speed supercharger arrangement as reflected by the curve 170 is the same at 2000 R. P. M. as for the inflexibly geared supercharger whereas the magnitude of the 1000 R. P. M. ordinate of the upper curve 170 is slightly more than 50% greater than the 1000 R. P. M. ordinate of the middle curve 168. Hence a conventionally inflexibly geared supercharged engine having a stall torque of 400 ft. lbs. may be adapted by application of the present improvement so as to have a stall torque of 600 ft. lbs. and as already noted a 600 ft. lb. torque when passed through the presently improved split path torque converter drive is inherently caused to be increased to 1320 ft. lbs. total available output torque. The overall torque ratio increase thus made available by the present improvement in terms of 1320 ft. lbs. divided by the 400 ft. lbs. initial torque is 3.3:1 thus yielding approximately a 230% increase in torque over a conventional inflexibly geared supercharged engine system.

The three element torque converter component of the present arrangement cooperates in a dual manner with the planetary gear component toward the realization of these results of 230% increase in total torque. In the first place the torque converter is a slip drive device which by means of the slip drive allowed during stall conditions of the shaft 82 permits the converter input element 76 to overspeed and drive the air impeller 122 at a greater than normal ratio through the series connected planetary gear component and the accessory drive gear train leading to the layshaft 120. In the second place, the three element torque converter in providing a slip drive at the stall condition of the shaft 82, at the same time serves to multiply by three times the 60% portion of the torque handled by the torque converter and thus of itself adds to the yield of a greater amount of torque applied to the turbine element 78 which is splined to the central shaft 82. The pump element 76 in the torque converter component yields a third function to this component of the presently disclosed arrangement in that the pump element 76 connects the gear train from the pinion 118 to the central shaft 82 so as to insure an adequate continuous load on the optionally provided turbine component 126 in the event a turbocharger unit is employed for providing super-atmospheric air to the induction manifold 14 to the engine P.

As herein disclosed, the present prime-power torque-transmitting apparatus is shown to incorporate a single stage torque converter type of slip drive device having three elements in the torque converter. It is evident that a multi-stage converter may be employed if higher converter multiplication results are desired and that a mere two-element fluid coupling device may be used in certain applications in place of the hydrodynamic torque converter where only speed reduction and no torque multiplication is desired through the split path drive. So also the drawing shows a single planetary 1.6:1 step up gearing for over-speeding the input element of such slip drive device but self-evidently a lower ratio may be employed and for that matter a higher ratio can also be accomplished through a differently geared single planetary gear set or else through use of a compound or tandem planetary arrangement. The prime power source embodied is a centrifugally supercharged diesel engine for driving the transmission but it is not essential to the invention that a centrifugally supercharged diesel engine be employed and a Root's Blower in combination with a forced air burning prime mover may be effectively employed and also other different engines which are otherwise supercharged may be employed to equal advantage.

Variations within the spirit and scope of the invention described are equally comprehended by the foregoing description.

I claim:

1. For use with a supercharged engine source of prime power, the combination of a drive shaft, a load-connected driven shaft, means for providing parallel power paths between said shafts constituted by a primarily speed reducing train having a secondary speed increasing portion, said means comprising a planetary differential gear component having a driving portion connected to said drive shaft and provided with a main output portion driven at a varying reduction ratio between stall and 1:1 and connected to said driven shaft and a reaction member having a speed varying above 1:1 in an inverse ratio with respect to the speed of said main output portion and constituting said secondary speed increasing portion of said train, and a torque-multiplying hydrodynamic slip drive component for coupling together said reaction member and said driven shaft in slip-drive-transmitting relationship so as to slip progressively more under increasing load, and an engine supercharger having a step-up gear train for driving the same at a proportional greater speed than the speed of said reaction member whereby, under conditions of drastic speed decrease of the driven shaft due to load and a consequent increase of slip in the torque multiplying slip drive component, the compensating inverse speed effect of the reaction member causes a relative increase in the overall speed increasing ratio through said differential gear component and said step-up gear train to said supercharger.

2. For use with a supercharged engine source of prime power, the combination of a drive shaft, a load-connected driven shaft, means for providing parallel power paths between said shafts constituted by a primarily speed reducing train having a secondary speed increasing portion, said means comprising a differential gear component having a driving portion connected to said drive shaft and provided with a main output portion driven at a varying reduction ratio between stall and 1:1 and connected to said driven shaft, and a reaction member having a speed varying above 1:1 in an inverse ratio with respect to the speed of said main output portion and constituting said secondary speed increasing portion of said train, and a torque multiplying hydrodynamic slip drive component for coupling together said reaction member and said driven shaft in slip-drive-transmitting relationship so as to slip progressively more under increasing load, and an engine supercharger having means for driving the same at a proportional greater speed than the speed of said reaction member whereby, under conditions of a lowered speed of the driven shaft due to load and a consequent increase of slip in the torque-multiplying slip drive component, the compensating inverse speed effect of the reaction member causes a relative increase in the overall speed increasing ratio through said differential gear component and said last-named means to said supercharger.

3. For use with an engine source for deriving prime power from a combustible mixture and having a forced air induction system, the combination of a drive shaft, a load connected driven member, means for providing parallel power paths between said shaft and said member constituted by a primarily speed reducing train having a secondary speed increasing portion, said means comprising a differential gear component having a driving portion connected to said drive shaft and provided with a main output portion driven at a varying reduction ratio between stall and 1:1 and connected to said driven member, and a reaction member having a speed varying above 1:1 in an inverse ratio with respect to the speed of said main output portion and constituting said secondary speed increasing portion of said train, and a hydrodynamic slip drive component having an input element connected to said reaction member and an output element connected to said driven member for coupling together said members in slip-drive-transmitting relationship so as to slip progressively more under increasing load, and air impeller means for supplying forced air for said induction system having a step-up gear train connected to said input element of the slip drive component for driving the air impeller means at a proportional greater speed than the speed of said reaction member whereby, under conditions of drastic speed decrease of the driven member due to load and a consequent increase of slip in the slip drive component, the compensating inverse speed effect of the reaction member causes a relative increase in the overall speed increasing ratio through said differential gear component and said step-up gear train to said air impeller means.

4. For use with a supercharged engine source for deriving prime power from the conversion of combustible charges into waste gases, the combination of a drive shaft, a load-connected driven shaft, means for providing parallel power paths between said shafts constituted by a primarily speed reducing train having a secondary speed increasing portion, said means comprising a planetary differential gear component having a driving portion connected to said drive shaft and provided with a main output portion driven at a varying reduction ratio between stall and 1:1 and connected to said driven shaft, and a reaction member having a speed varying above 1:1 in an inverse ratio with respect to the speed of said main output portion and constituting said secondary speed increasing portion of said train, and a torque-multiplying hydrodynamic slip drive component for coupling together said reaction member and said driven shaft in slip-drive-transmitting relationship so as to slip progressively more under increasing load, an engine supercharger having a step-up gear train for driving the same at a proportional greater speed than the speed of said reaction member whereby, under conditions of lowered speed of the driven shaft due to load and a consequent increase of slip in the torque-multiplying slip drive component, the compensating inverse speed effect of the reaction member causes a relative increase in the overall speed increasing ratio through said differential gear component and said step-up gear train to said supercharger, and a waste gas turbine drivingly connected to the supercharger and to the gear train for applying torque to the same.

5. For use with a supercharged engine source for deriving prime power from the conversion of combustible charges into waste gases, the combination of a drive shaft, a load-connected driven shaft, means for providing parallel power paths between said shafts constituted by a primarily speed reducing train having a secondary speed increasing portion, said means comprising a planetary differential gear component having a driving portion connected to said drive shaft and provided with a main output portion driven at a varying reduction ratio between stall and approximately 1:1 and connected to said driven shaft, and a reaction member having a speed varying above 1:1 in an inverse ratio with respect to the speed of said main output portion and constituting said secondary speed increasing portion of said train, and a torque-multiplying hydrodynamic slip drive component for coupling together said reaction member and said driven shaft in slip-drive-transmitting relationship so as to slip progressively more under increasing load, an engine supercharger, a step-up gear train connected between the reaction member and the supercharger for driving the latter at a proportional greater speed than the speed of said reaction member whereby, under conditions of drastic speed reduction of the driven shaft due to load and a consequent increase of slip in the torque-multiplying slip drive component, the compensating inverse speed effect of the reaction member causes a relative increase in the overall speed increasing ratio through said differential gear component and said step-up gear train to said supercharger, a waste gas turbine, said supercharger and said waste gas turbine each having a shaft fast thereto and axially aligned with the shaft of the other, and a clutch portion connected to each of the last said shafts and engageable to establish a one-way drive therebetween so as to render the turbine effective to drive the supercharger and assist in driving the gear train and said reaction member.

6. In combination, a waste-gas-discharging diesel engine having a supercharger, a change speed constant mesh gear transmission, and means including an overspeeded torque converter for coupling together the engine and the transmission and simultaneously driving said supercharger, said means comprising an epicyclic gear set having an input portion drivingly connected to the engine, an output member connected to the transmission, and a reaction member connected to one element in the torque converter, another element in said torque converter being connected to said transmission for driving the same in a slip drive torque multiplying ratio at relatively low speeds of the transmission, and means drivingly connecting said one element in said torque converter and said supercharger.

7. In combination, a waste-gas-discharging diesel engine having a supercharger, a change speed constant mesh gear transmission connected to a load, and means including an overspeeded torque converter for coupling together the engine and the transmission and for simultaneously controlling the maximum speed of said supercharger in dependence on said load, said means comprising an epicyclic reduction gear set having an input member drivingly connected to said engine, a main output member connected to the transmission, and an overspeeded reaction member connected to one element in the torque converter, another element in said torque converter being connected to said transmission for driving the same in a slip drive torque multiplying ratio at relatively low speeds of the transmission against the load, means drivingly connecting said one element in the torque converter and said supercharger, and a waste-gas-turbine drivingly connected to said supercharger to drive the same at speeds limited to the maximum controlled speed as aforesaid dependent on said load.

8. In combination, a waste-gas-discharging diesel engine having a supercharger, a change speed constant mesh gear transmission connected to a load, and means including an overspeeded torque converter for coupling together the engine and the transmission and simultaneously controlling the maximum speeds of said supercharger in dependence on the resistance of said load, said means comprising an epicyclic gear set having an engine driven input member, an output member connected to the transmission and a reaction member connected to one element in the torque converter, another element in said torque converter being connected to said transmission for driving the same in a slip drive torque multiplying ratio at relatively low speeds of the transmission under resistance of said load, means drivingly connecting said one element in the torque converter and said supercharger, a waste gas turbine, and means connecting the supercharger for movement with the waste gas turbine at the controlled speeds aforesaid.

9. In combination, a waste-gas-discharging diesel engine having a supercharger, a change speed constant mesh gear transmission, and means including an overspeeded torque converter for coupling together the engine and the transmission and for simultaneously driving said supercharger, said means comprising an epicyclic gear set having an engine driven input portion, said gear set further having an output member connected to the transmission and a reaction member connected to one element in the torque converter, another element in said torque converter being connected to said transmission for driving the same in a slip drive torque multiplying ratio at relatively low input speeds to the transmission, means drivingly connecting said one element in the torque converter and said supercharger, a gas turbine driven by the waste-gas discharged from the engine, and one-way-clutch driving means connecting the supercharger for movement with the waste gas turbine.

10. In combination, an engine, an engine supercharger, a waste gas turbine driven by gases from the engine, first means for drivingly connecting said turbine and said supercharger in non-return drive, and second means for stabilizing the drive from said turbine to said supercharger including an overspeeded torque converter effective to provide drive speeds of some magnitudes whereby the supercharger overruns the waste gas turbine, said torque converter having an input element connected to said first means and an output element, said second means further including a drive shaft connected to the engine, a driven shaft, an epicyclic gear set having a driving member connected to said drive shaft, an ouput member connected to said driven shaft, and an overspeeded reaction member connected to the first means aforesaid for driving the supercharger and connected to said input element of the torque converter for overspeeding the same, said output element of the torque converter being connected to said driven shaft for driving the same in a slip drive torque multiplying ratio at speeds normally lower than the speed of said overspeeded input element.

11. In combination, a gas producing source of power, an engine supercharger, a waste gas turbine driven by gases from the source of power, first means for drivingly connecting said turbine and said supercharger in non-return drive, and second means for stabilizing the drive from said turbine to said supercharger including an overspeeded plural-element fluid slip drive device effective to provide varying ratio drive speeds of some magnitudes whereby the supercharger overruns the waste gas turbine, said slip drive device having an input element connected to said first means and an output element, said second means further including a driving shaft adapted for connection to said source of power, a driven shaft, an epicyclic differential gear set having a drive member connected to said driving shaft, an output member connected to said driven shaft, and an overspeeded reaction member connected to the first means aforesaid for driving the supercharger and connected to said input element of the slip drive device for overspeeding the same, said output element of the slip drive device being connected to the driven shaft for driving the same in a slip drive varying ratio as aforesaid at speeds normally lower than the speed of said overspeeded input element.

12. For use with an engine source for deriving prime power from a combustible mixture, said engine source having a forced air induction system and having means forming an exhaust path for the flow of combustion gases under super-atmospheric pressure, the combination of a drive shaft, a load connected driven member, means for providing parallel power paths between said shaft and said member constituted by a primarily speed reducing train having a secondary speed increasing portion, said just-named means comprising a differential gear component having a driving portion connected to said drive shaft and provided with a main output portion driven at a varying reduction ratio between stall and approximately 1:1 and connected to said driven member, and a reaction member having a speed varying above 1:1 in an inverse ratio with respect to the speed of said main output portion and constituting said secondary speed increasing portion of said train, and a multi-element fluid slip drive component having an input element connected to said reaction member and output element connected to said driven member for coupling together said members in a slip drive transmitting relationship whereby slip increases with increases of load, air impeller means for supplying forced air for said induction system, a step-up gear train connecting the input element of said slip drive component and said air impeller means for driving the latter at a proportional greater speed than the speed of the input element and said reaction member whereby, under conditions of drastic speed decrease of the driven member due to increase of load and a consequent increase of slip in the slip drive component, the compensating inverse speed effect of the reaction member causes a relative increase in the overall speed increasing ratio through said differential gear component and said step-up gear train to said air impeller means, and a turbine interposed in the super-atmospheric flow path of combustion exhaust gases effective to drive said air impeller means and to drive said input element through said step-up gear train.

13. Compounded engine apparatus comprising a pair of axially aligned driving and driven main shafts, a pair of axially aligned driving and driven layshafts, a fuel and air burning source of prime power connected to drive said driving main shaft and producing hot waste gases from the resulting combustion process, an air impeller driven by said driven layshaft and connected to force combustion supporting air to the source of prime power, an auxiliary source of power permanently connected to, for continuously receiving hot combustion gases from, the prime power source and effective to drive said driving layshaft, constantly meshed gear means connected between said main shafts including a carrier-driven planet and a first gear which is splined to the driven main shaft and about which said plant orbits, constantly meshed gear means including the planet and a second gear about which the planet orbits and connected between said driving main shaft and said driven layshaft, a coupling device having a portion connected to each of said layshafts and positively engagebale to establish conjoint 1:1 rotation of the layshafts, and a torque coupling device having fluid connected elements one fast to said second gear and the other splined to said driven main shaft and establishing a torque slip drive therebetween.

14. Compounded engine apparatus comprising a pair of axially aligned driving and driven main shafts, a pair of axially aligned driving and driven layshafts, a fuel and air burning source of prime power connected to drive said driving main shaft and producing hot waste gases from the resulting combustion process, an air impeller driven by said driven layshaft and connected to force a stream of combustion supporting air to the source of prime power, an auxiliary source of power permanently connected to, for continuously receiving hot combustion gases from, the prime power source and effective to drive said driving layshaft, constantly meshed gear means connected between said main shafts including a carrier-driven planet and a first gear which is splined to the driven main shaft and about which said planet orbits, constantly meshed gear means including the planet and a second gear about which the planet orbits and connected between said driving main shaft and said driven layshaft, a one-way coupling device having a portion connected to each of said layshafts and positively engageable to establish conjoint 1:1 rotation of the layshafts, and a fluid impelling element fast to said second gear and a fluid driven element splined to said driven main shaft and together being fluid connected to form a torque multiplying device establishing a torque slip drive therebetween.

15. Compounded engine apparatus comprising a pair of axially aligned driving and driven main shafts, a pair of axially aligned driving and driven layshafts, a fuel and air burning prime power machine connected to drive said driving main shaft and producing hot waste gases from the resulting combustion process, air impelling means driven by said driven layshaft and connected to force combustion supporting air to the prime power machine, an auxiliary machine permanently connected to, and continually receiving hot combustion gases from, the prime power machine so as to provide an auxiliary source of driving power and being drivingly connected to said driving layshaft, means coupling said driving and driven main shafts together in varying ratio split drive and including adjacent fluid driven and gear driven output elements mechanically connected in parallel to one another and both splined in common to the driven main shaft, said means further including a normally over-speeded reaction element, independent means coupling said driving and driven layshafts together, and constantly meshing gear means connected to said reaction element and to said driven layshaft providing a drive path from said driven layshaft to said reaction element and first named coupling means when said auxiliary machine is effective as a source of driving power and otherwise providing a drive path from the prime power machine and first named coupling means to said driven layshaft and air impelling means.

16. Compounded engine apparatus comprising a pair of axially aligned driving and driven main shafts, a pair of axially aligned driving and driven layshafts, a fuel and air burning prime power machine connected to drive said driving main shaft and producing hot waste gases from the resulting combustion process, air impelling means driven by said driven layshaft and connected to force combustion supporting air to the prime power machine, an auxiliary machine permanently connected to, for continuously receiving hot combustion gases from, the prime power machine so as to provide an auxiliary source of driving power and being drivingly connected to said driving layshaft, combined mechanico-hydrodynamic means coupling said driving and driven mainshafts together in varying ratio split drive and including fluid driven and gear driven output elements mechanically connected in parallel to one another and both made fast to common adjacent portions of the driven main shaft, said means further including a normally overspeeded reaction element, independent one-way clutch means coupling said driving and driven layshafts together in non-return drive, and continuously meshing gear means connected to said reaction element and to said driven layshaft providing a drive path from said driven layshaft to said reaction element and first named coupling means when said auxiliary machine is effective as a source of driving power and otherwise providing a drive path from the prime power machine and first named coupling means to said driven layshaft and air impelling means.

17. Compounded engine apparatus comprising a pair of axially aligned driving and driven main shafts, a pair of axially aligned driving and driven layshafts, a fuel and air burning prime power machine connected to drive said driving main shaft and producing hot waste gases from the resulting combustion process, air impelling means driven by said driven layshaft and connected to force combustion supporting air to the prime power machine, an auxiliary machine effectively connected to receive hot combustion gases from the prime power machine so as to provide an auxiliary source of driving power and being drivingly connected to said driving layshaft, means coupling said driving and driven mainshafts together in varying ratio drive, said means including a normally overspeeded reaction element, independent means coupling said driving and driven layshafts together, and a train formed of a plurality of constantly meshing gears connected to said reaction element and to said driven layshaft providing a speed reduction drive path from said driven layshaft to said reaction element and first named coupling means when said auxiliary machine is effective as a source of driving power and otherwise providing conversely a speed increasing drive path from the prime power machine and first named coupling means to said driven layshaft and air impelling means, the respective said pairs of coaxial main shafts and coaxial layshafts occupying a common plane and being transversely offset to one another in parallel relationship.

References Cited in the file of this patent

UNITED STATES PATENTS

| | | |
|---|---|---|
| 2,147,528 | Föttinger | Feb. 14, 1939 |
| 2,281,077 | Pollard | Apr. 28, 1942 |
| 2,377,199 | Adams et al. | May 29, 1945 |
| 2,397,941 | Birkigt | Apr. 9, 1946 |
| 2,402,547 | Gilfillan | June 25, 1946 |
| 2,467,077 | Brunken | Apr. 12, 1949 |